UNITED STATES PATENT OFFICE.

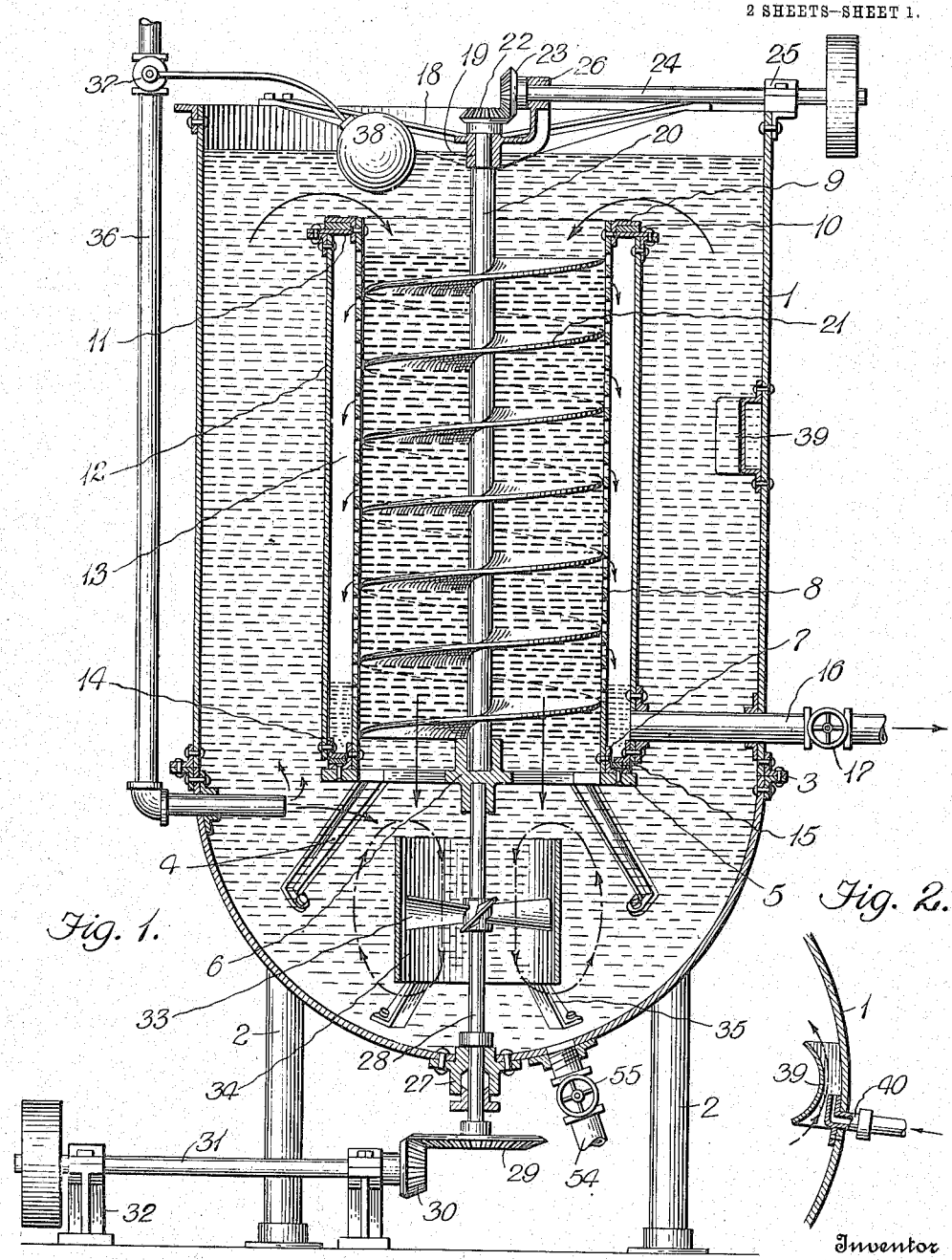

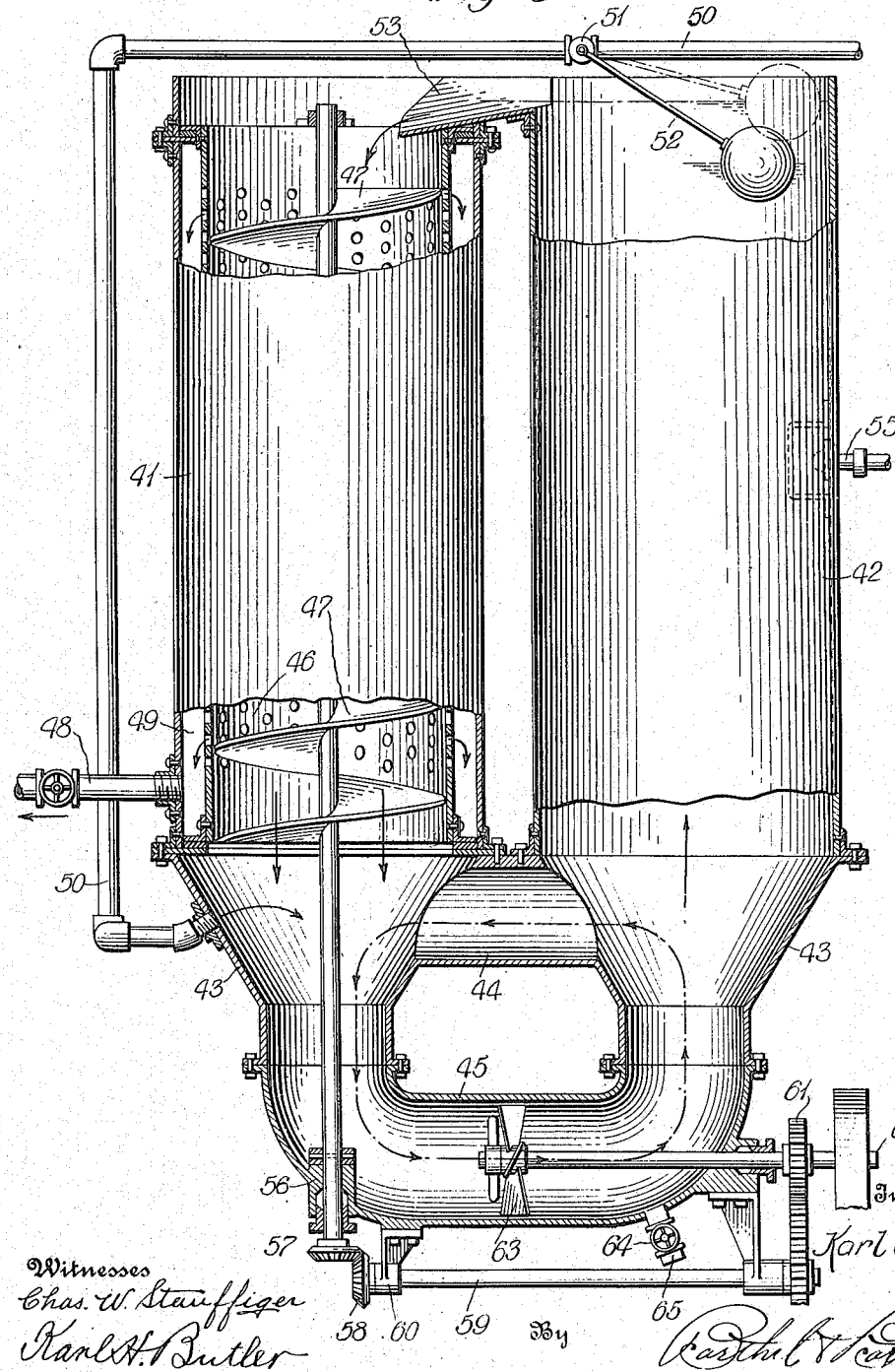

KARL NOLLER, OF DETROIT, MICHIGAN, ASSIGNOR OF ONE-HALF TO FRANK KERSTEN, OF DETROIT, MICHIGAN.

FILTER-PULP-WASHING MACHINE.

1,129,419. Specification of Letters Patent. Patented Feb. 23, 1915.

Application filed April 27, 1914. Serial No. 834,787.

*To all whom it may concern:*

Be it known that I, KARL NOLLER, a citizen of the United States of America, residing at Detroit, in the county of Wayne and State of Michigan, have invented certain new and useful Improvements in Filter-Pulp-Washing Machines, of which the following is a specification, reference being had therein to the accompanying drawings.

This invention relates to a filter pulp washing machine, and the primary object of my invention is to provide a positive and reliable means, in a manner as hereinafter set forth, for removing yeast cells, filth and other matter held in suspension by wood pulp or a filter mass used in breweries for cleansing and purifying fluids.

Another object of my invention is to provide a washing machine of the above type wherein mechanically operated means are utilized in connection with a screen and a continuous circulation of water for removing foreign matter or a residue deposited in filter pulp by passing a fluid therethrough, and the aqueous agitation of the pulp tends to maintain the same in a flocculent or silky condition conducive to perfect filtration.

A further object of this invention is to provide a washing machine of the above type embodying a screen and a novel conveyer for carrying pulp against the same without any danger of the screen becoming clogged and the efficiency of the washing machine impaired.

A still further object of my invention is to provide a compact and durable filter pulp washing machine in which filter pulp can be continuously circulated and subjected to an aqueous agitation that opens the fibers of the pulp and releases yeast cells and other matter held thereby.

With the above and other objects in view, the invention resides in the novel construction, combination and arrangements of parts to be hereinafter specifically described and then claimed.

Reference will now be had to the drawings, wherein—

Figure 1 is a vertical sectional view of the preferred form of washing machine; Fig. 2 is a horizontal sectional view of a portion of the same, illustrating an injector for maintaining a circulation, and Fig. 3 is a front elevation of a modified form of machine, partly broken away and partly in section.

In describing my invention by aid of the views above referred to, I desire to point out that I intend the same as merely illustrative of an example whereby my invention may be applied in practice, and I do not care to limit my invention to the precise construction and arrangement of parts shown. The following description is therefore to be broadly construed as including substitute constructions and arrangements which are the obvious equivalent of those shown.

In the drawings, the reference numeral 1 denotes a vertically disposed cylindrical tank having the upper end thereof open and the lower end supported by uprights or columns 2. The bottom of the tank is semi-spherical to permit of the tank being easily drained and to assist in the circulation of filter pulp and water therein. As a matter of good construction and to facilitate assembling devices within the tank, the bottom of the tank is made separate from the body and connected thereto, as at 3.

Arranged concentrically within the bottom of the tank and held therein by a plurality of angularly disposed legs 4 is a horizontal support 5 having the central portion thereof in the form of a spider or double bearing 6. Mounted upon the support 5 by a circular angle bar 7 or other fastening means is a vertical tabular screen or foraminous body 8 that has the upper end thereof flanged or provided with a circular angle bar 9 and a gasket 10 to engage an inwardly projecting annular closure 11 mounted upon the upper end of a vertical cylinder 12. The cylinder 12 is of a greater diameter than the screen 8, thereby providing an annular passage or chamber 13, and the lower end of the cylinder has a circular angle bar 14 and a gasket 15 engaging the circular angle bar 7 of the support 5. The upper and lower ends of the annular passage 13 are therefore sealed or closed and to permit of water or other fluid being withdrawn from the lower end of the cylinder 12, said cylinder has an outlet pipe 16 extending through the side wall of the tank 1. The pipe 16 has a valve 17 which is closed when the mass is to be cleaned.

The screen 8 and the cylinder 12 extend in proximity to the upper end of the tank 1, which is provided with a spider 18 having a bearing 19 vertically alining with the spider or double bearing 6 of the support 5. Journaled in these bearings are the ends of a vertical conveyer shaft 20 that has a spiral conveyer 21 within the screen 8. The peripheral edges of the conveyer 21 are in proximity to the inner walls of the screen to serve functionally as scrapers for preventing the perforations or orifices of the screen from becoming clogged or filter pulp massed or coated upon the inner walls thereof. I attach considerable importance to this arrangement of parts, as they preclude any possibility of a retardation in the washing of filter pulp or other material.

The upper end of the conveyer shaft 20 has a horizontally disposed beveled gear wheel 22 meshing with a beveled gear wheel 23 mounted upon the end of a driven shaft 24, journaled in bearings 25 and 26. The bearing 25 is supported by the upper edge of the tank 1 and the bearing 26 forms part of a bracket of the spider 18. The shaft 24 can be driven from a suitable source of power whereby the conveyer can be revolved within the tubular screen 8 to convey filter pulp or a filter mass from one end thereof to the opposite end.

The bottom of the tank 1 has a bearing and stuffing box 27 for a propeller shaft 28 that has the upper end thereof revolubly mounted in the spider or double bearing 6 of the support 5. The lower end of the propeller shaft 28 has a beveled gear wheel 29 meshing with a similar wheel 30 mounted upon a driven shaft 31, journaled in suitable bearings 32. The shaft 28, within the bottom of the tank, is provided with a propeller 33, which is horizontally disposed for maintaining a circulation of filter pulp and water within the bottom of the tank. The propeller is facilitated in this respect by a short vertically disposed conduit 34 supported by angularly disposed legs 35 within the bottom of the tank.

Arranged in parallelism with the tank 1 is a vertically disposed water supply pipe 36 which has the lower end thereof extending into the side of the tank contiguous to the support 5. The pipe 36 has a valve 37 that is regulated through the medium of a float 38 upon the surface of the fluid mass within the tank.

The inner side of the tank, preferably above the outlet pipe 16, has a deflector 39 into which extends a pipe 40, said deflector and pipe constituting an injector adapted to admit steam or water to the tank 1 to maintain a circulation therein. When steam is used for this purpose, the same facilitates the cleansing of filter pulp and places it in a fibrous and silky condition, and in either instance, steam or water, a swirling of the contents of the tank is produced that insures a thorough commingling of the filter pulp and cleansing agent.

The bottom of the tank 1 has a discharge pipe 54 provided with a valve 55 and this discharge pipe permits of the tank being drained or quantities of washed pulp removed therefrom.

Reference will now be had to Fig. 3, illustrating a modification of the invention, wherein tanks 41 and 42 are arranged in parallelism and provided with contracted or conical shaped lower ends 43 connected by a straight conduit 44 and a U connection 45. These conduits permit of a circulation of pulp and water being maintained, as indicated by arrows, in the lower ends of the tanks. The tank 41 is used as a segregating receptacle for separating pulp and foreign matter that might be held in suspension thereby and the tank 42 serves as a mixing tank whereby the cleansing agent and pulp can thoroughly commingle. The tank 41 has a tubular screen 46, a spiral conveyer 47, an outlet pipe 48 for the chamber 49 formed by the screen and tank, and a water supply pipe 50 that communicates with the contracted end of said tank. This water supply pipe extends over the upper ends of the tanks and has a valve 51 regulated by a float 52 within the upper end of the tank 42. The tank 42 has an over-flow trough 53 discharging into the upper end of the tubular screen 46, and an injector 55 that maintains a circulation within the tank 42.

The shaft of the spiral conveyer 47 extends downwardly through a bearing and stuffing box 56 carried by the U connection 45 and is provided with a beveled gear wheel 57 meshing with a similar wheel 58 mounted upon the end of a shaft 59, journaled in bearings 60, carried by the connection 45. The shaft 59 is driven through the medium of a train of gears 61 from a propeller shaft 62 revolubly supported by the connection 45. The shaft 62 within the connection has a propeller 63 and the outer end of said shaft is adapted to be driven from a suitable source of power. The propeller 63 maintains a circulation of the pulp and cleansing agent in the lower ends of the tanks 41 and 42, and to drain or remove pulp from the tanks, it is only necessary to open a valve 64 carried by a discharge pipe 65 connected to the bottom of the connection 45.

In the operation of either machine of the continuous circulation of the cleansing agent or the aqueous agitation of the contents of the machine tends to maintain the contents at a uniform density throughout, thus preventing unevenly condensed or matted portions of pulp within the machine. The conveyers carry the pulp into engagement with the screens where the dirty water from the pulp passes through the screens by virtue of the greater specific gravity of the water, as compared to the pulp, and during this operation the peripheral edges of the conveyers prevent the apertures or interstices from being clogged or pulp massed against the inner walls of the screens.

A filter mass impregnated with yeast or foreign matter can be easily placed in the upper end of the tank 1 to be drawn down through the tubular screen by the rotative action of the conveyer and during such passage foreign matter is carried off through the chamber 13 and the outlet pipe 16. The filter mass encounters the aqueous agitation maintained by the propeller 33, also the inlet of fresh water or cleansing agent from the supply pipe 36. This aqueous agitation places the particles of the filter mass in light and fluffy condition and the particles can be repeatedly carried through the tubular screen until they have been thoroughly cleansed.

The water or cleansing agent entering the lower end of the tank tends to produce an upward current that carries the filter pulp from the lower end thereof to the top of the tank from where it is carried downwardly by the combined conveyer and scraper within the tubular screen. The supply of water to the tank is controlled by the float in the upper end thereof and as fast as the dirt and foreign matter is extracted and carried off, just so fast is water or a cleansing agent admitted to the tank. By operating the conveyer independently of the circulating medium within the bottom of the tank it is possible to maintain a swift current within the tank and to slowly convey pulp lengthwise of the screen whereby dirty water will have sufficient time to pass through the pervious walls of the conveyer inclosure.

From the foregoing it will be observed that after the filter mass has been cleaned, the water supply can be shut off and the machine reversed for a short time to allow a certain quantity of water to drain from the machine and place the filter mass in condition for use. Furthermore, it is through the medium of the propeller and the injector that the filter mass within the machine is subjected to an aqueous agitation that maintains the filter mass in circulation with positive assurance that at one time or another particles of the mass will pass lengthwise of the screen and dirty water and foreign matter drawn off.

What I claim is:

1. A machine of the type described, comprising a tank adapted to receive filter pulp and water, a tubular screen vertically disposed within said tank, a cylinder surrounding said screen and providing an inclosed chamber, a pipe connected to said cylinder and extending through the wall of said tank, means within said screen and driven at the top of said tank for simultaneously scraping the walls thereof and conveying the contents of said tank lengthwise of said screen, a conduit in communication with said tank below said screen, mechanically operated means within said conduit and driven at the bottom of said tank for producing a circulation of the contents of said tank therethrough, and means extending into a wall of said tank for producing a circulation of the contents thereof around said cylinder.

2. A filter pulp washing machine comprising a tank having the bottom thereof provided with a discharge pipe, a horizontal support arranged in the lower part of said tank and providing a double bearing, a vertically disposed tubular screen mounted upon said support, a cylinder surrounding said screen and providing an inclosed chamber, an outlet pipe connected to said cylinder and extending through the wall of said tank, a spider carried by the upper end of said tank, a conveyer shaft journaled in said spider and the double bearing of said support, a spiral conveyer carried by said shaft and contacting with the inner walls of said screen, a propeller shaft journaled in the bottom of said tank and the double bearing of said support, a propeller carried by said shaft, a vertically disposed conduit supported above the bottom of said tank and surrounding said propeller, a water supply pipe extending into the bottom of said tank, a float regulated valve in connection with said pipe, a pipe extending into said tank, a deflector at the inner end of said pipe, and coöperating therewith in providing an injector, and means to facilitate the rotating of said shafts.

In testimony whereof I affix my signature in presence of two witnesses.

KARL NOLLER.

Witnesses:
KARL H. BUTLER,
ANNA M. DORR.